W. L. KISSEL.
SPROCKET WHEEL CLIP.
APPLICATION FILED APR. 13, 1910.

1,047,239.

Patented Dec. 17, 1912.

Witnesses:
J. C. Devick.
C. Paul Parker

Inventor:
William L. Kissel,
By Luther L. Miller
Attorney.

UNITED STATES PATENT OFFICE.

WILLIAM L. KISSEL, OF HARTFORD, WISCONSIN, ASSIGNOR TO SEARS, ROEBUCK & COMPANY, OF CHICAGO, ILLINOIS, A CORPORATION OF NEW YORK.

SPROCKET-WHEEL CLIP.

1,047,239.

Specification of Letters Patent.   Patented Dec. 17, 1912.

Application filed April 13, 1910.   Serial No. 555,184.

*To all whom it may concern:*

Be it known that I, WILLIAM L. KISSEL, a citizen of the United States, residing at Hartford, in the county of Washington and State of Wisconsin, have invented certain new and useful Improvements in Sprocket-Wheel Clips, of which the following is a specification.

This invention relates to devices for securing sprockets to their driving wheels, and is particularly adapted for securing a driving sprocket to the rear wheel of an ordinary farm wagon when it is desired to use the running gear of such a wagon for carrying a box manure spreader.

There are two standard widths of farm wagon gears. The box spreaders with which my invention is especially intended for use may be made in two widths to correspond with the standard widths of wagon gears. Slight variations, however, sometimes occur in the distance between the rear wheels or in the amount of dish of the wheels, and to take care of these variations I have produced means for attaching the driving sprocket wheels at variable distances from the inner side of the wagon wheels, so that the sprocket wheels may be properly alined with the coöperating devices on the spreader box.

Figure 1:
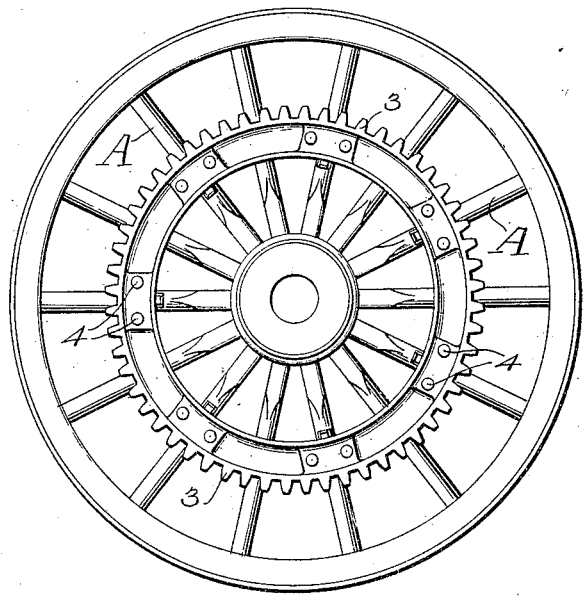
Figure 2:
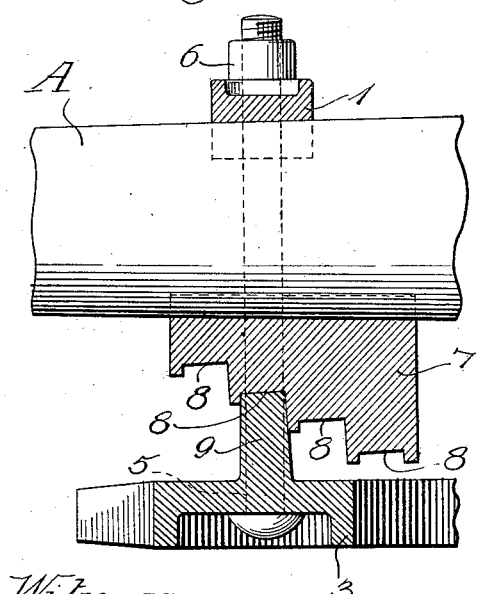
Figure 3:
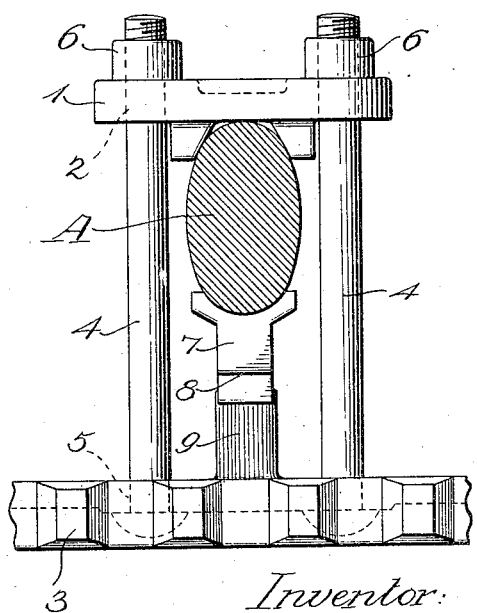

In the accompanying drawings, Figure 1 is a side elevation of a wagon wheel showing a driving sprocket attached thereto by means of devices embodying the features of my invention. Fig. 2 is the fragmental side elevation of a wagon wheel spoke and a section through the sprocket wheel and its fastening clip. Fig. 3 is a section through a spoke showing the fastening clip and a fragment of the sprocket wheel in top plan.

In securing a sprocket to a wagon wheel, any number of clips may be used which will be sufficient to firmly hold the sprocket in place. In Fig. 1, I have shown the number of clips as being half the number of spokes in the wagon wheel, each alternate spoke having a clip secured thereto.

The embodiment of my invention which I have herein shown comprises a yoke 1, arranged to engage one side of one of the spokes A of the wagon wheel, said yoke having openings 2 therein. The sprocket wheel 3 is positioned at the opposite side of the wagon wheel and is clamped to a spoke of said wheel by means of a pair of bolts 4 lying at opposite sides of the spoke, said bolts passing through openings 5 in said sprocket wheel and through the openings 2 of the yoke 1. Nuts 6 are turned upon one end of said bolts, said nuts serving to draw the yoke 1 and sprocket 3 toward each other and firmly clamp them to the spoke of the wagon wheel.

The means for adjusting the sprocket wheel 3 at variable distances from the inner side of the wagon wheel comprises a spacer block 7 adapted to engage the wagon wheel spoke and lie between said spoke and the sprocket wheel 3. Upon the spacer block 7 are formed a plurality of steps 8 located at successively greater distances from the spoke. A lug 9 upon the inner face of the sprocket wheel 3 is arranged to bear against any one of said steps 8 and thereby space the sprocket 3 at the desired distance from the wagon wheel so that said sprocket will be in proper position to engage the drive chain on the spreader box. As shown in Fig. 2 the steps may be notched to receive the end of the lug 9 and thereby prevent movement of the spacer block longitudinally of the spoke. The side of the block 8 adjacent the spoke may be curved to conform to the shape of the spoke, as shown in Fig. 3. This prevents lateral movement of the block when the parts are secured in place. It will be understood that the spacer block 8 is clamped between the sprocket wheel and the wagon spoke by means of the bolts 4 and nuts 6.

It will be seen that my device provides a simple and convenient means for attaching a sprocket wheel to a wagon wheel and that the device may be readily adjusted to space the sprocket wheel at the proper distance from the wagon wheel.

I am aware that changes from the embodiment herein shown may be made without departing from the invention, therefore I do not limit myself to the exact details shown and described.

I claim as my invention:

The combination with a wagon wheel of a sprocket rim lying alongside said wheel, devices including pairs of bolts lying at opposite sides of the respective wagon wheel spokes and engaging said sprocket rim for securing said rim to the wagon wheel, a series of structurally independent spaced blocks positioned between said sprocket rim and the spokes of the wagon wheel, an annular series of lugs on said sprocket rim projecting laterally toward the wagon wheel, each of said spacer blocks having a plurality of steps of different heights thereon against any of which the adjacent lug on the sprocket rim is arranged to bear, said spacer blocks being adjustable longitudinally of the spokes and radially of the sprocket rim to carry their steps into position to be engaged by said lugs and thus space said sprocket rim at varying distances from the wagon wheel.

WILLIAM L. KISSEL.

Witnesses:
PAUL A. RIX,
ALBERT K. MENZEL.

Copies of this patent may be obtained for five cents each, by addressing the "Commissioner of Patents, Washington, D. C."